(12) United States Patent
Taniguchi et al.

(10) Patent No.: US 9,288,366 B2
(45) Date of Patent: Mar. 15, 2016

(54) OPTICAL SCANNING DEVICE AND IMAGE FORMING APPARATUS

(75) Inventors: Hajime Taniguchi, Toyokawa (JP);
Hidenari Tachibe, Toyokawa (JP);
Takafumi Yuasa, Toyokawa (JP);
Yoshitaka Otani, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 156 days.

(21) Appl. No.: 13/224,067

(22) Filed: Sep. 1, 2011

(65) Prior Publication Data
US 2012/0050827 A1    Mar. 1, 2012

(30) Foreign Application Priority Data

Sep. 1, 2010 (JP) ................. 2010-195327

(51) Int. Cl.
  *B41J 2/435*   (2006.01)
  *B41J 15/14*   (2006.01)
  *G02B 26/08*   (2006.01)
  *H04N 1/50*    (2006.01)

(52) U.S. Cl.
  CPC .................. *H04N 1/506* (2013.01)

(58) Field of Classification Search
  CPC ................................. H04N 1/506
  See application file for complete search history.

(56) References Cited

U.S. PATENT DOCUMENTS

| | | | | |
|---|---|---|---|---|
| 5,966,231 A | * | 10/1999 | Bush ............. | G02B 26/123 347/233 |
| 2006/0274385 A1 | * | 12/2006 | Babanats ........ | H04N 1/0402 358/509 |
| 2008/0212155 A1 | * | 9/2008 | Shoji ............. | G02B 26/0825 359/198.1 |

FOREIGN PATENT DOCUMENTS

| | | |
|---|---|---|
| JP | 10-268215 | 10/1998 |
| JP | 11-14921 | 1/1999 |
| JP | 2006-192653 | 7/2006 |
| JP | 2008-26570 | 2/2008 |
| JP | 2010-054591 | 3/2010 |

OTHER PUBLICATIONS

Japanese Decision to Grant a Patent drafted Sep. 21, 2012, directed to Japanese Application No. 2010-195327 w/English translation, 5 pgs.

* cited by examiner

*Primary Examiner* — Tammy Pham
*Assistant Examiner* — Frantz Bataille
(74) *Attorney, Agent, or Firm* — Lucas & Mercanti, LLP

(57) ABSTRACT

An optical scanning device comprises: photoreceptors corresponding one-to-one to solid colors; high-resolution light sources each emitting a set of beams irradiating the corresponding photoreceptor with a predetermined distance therebetween along a sub-scanning direction; a deflection unit; a first optical system directing the sets of beams from the high-resolution light sources to the deflection unit; a low-resolution light source emitting a set of beams irradiating a predetermined photoreceptor with a distance therebetween larger than the predetermined distance along the sub-scanning direction; and a second optical system directing all of the sets of beams to the corresponding photoreceptor. The low-resolution light source and first optical system are positioned so as not to physically interfere with the high-resolution light sources and first optical system, and so as to allow the set of beams from the low-resolution light source to scan an image forming area on the predetermined photoreceptor along a main-scanning direction.

16 Claims, 5 Drawing Sheets

OPTICAL SCANNING DEVICE AND IMAGE FORMING APPARATUS

This application is based on an application No. 2010-195327 filed in Japan, the contents of which are hereby incorporated by reference.

BACKGROUND OF THE INVENTION (1) Field of the Invention

The present invention relates to an optical scanning device that performs exposure scanning of a photoreceptor to form an electrostatic latent image on the photoreceptor, and also relates to an image forming apparatus comprising the optical scanning device.

(2) Description of the Related Art

Typically, an image forming apparatus using electrophotography, such as a printer and a copier, (i) forms an electrostatic latent image corresponding to image data on a photoreceptor drum by causing an optical scanning device to perform exposure scanning of the photoreceptor drum, and (ii) forms a toner image by developing the formed electrostatic latent image by using toner. The formed toner image is transferred to a recording sheet, such as a recording paper and an OHP sheet. Then, a fixing device fixes the transferred toner image to the recording sheet.

An image forming apparatus capable of forming a full-color image comprises four photoreceptor drums to form four toner images in yellow (Y), magenta (M), cyan (C) and black (K), respectively. Electrostatic latent images are formed on the respective photoreceptor drums by the optical scanning device emitting laser beams that are in one-to-one correspondence with pieces of image data for Y, M, C and K and that irradiate the respective photoreceptor drums.

In the above image forming apparatus, the laser beams irradiating the four respective photoreceptor drums are each generated by a different one of four semiconductor laser elements. First, a first optical system causes the laser beams generated by the respective semiconductor laser elements to irradiate a rotating polygon mirror. Next, the rotating polygon mirror causes the four laser beams to proceed along a main scanning direction extending parallel to the direction of axes of the photoreceptor drums. Thereafter, a second optical system causes the four laser beams to irradiate the respective photoreceptor drums.

Each of the photoreceptor drums is rotated when irradiated by the corresponding laser beam. The laser beams scan the respective photoreceptor drums along the main scanning direction, while sequentially changing its position along a sub scanning direction. Consequently, an electrostatic latent image made of dots is formed on the circumferential surface of each photoreceptor drum.

In general, when a full-color image is to be formed, an electrostatic latent image having a high resolution of, for example, 1200 DPI is formed on each of the circumferential surfaces of the four photoreceptor drums. In contrast, when a monochrome image is to be formed, an electrostatic latent image having a low resolution of, for example, 600 DPI is formed only on the circumferential surface of one of the four photoreceptor drums on which a toner image in the color K is to be formed.

In such a case where the electrostatic latent image having a low resolution of 600 DPI is to be formed, a laser beam repeatedly scans one photoreceptor drum along the main scanning direction, with a distance of 42 μm between every two scan lines (along the sub scanning direction). In contrast, in a case where an electrostatic latent image having a high resolution of 1200 DPI is to be formed, each laser beam scans the corresponding photoreceptor drum along the main scanning direction, with a distance of 21 μm between every two scan lines (along the sub scanning direction). This is for increasing the dot density of the electrostatic latent image to be formed on each photoreceptor drum.

Therefore, in a case where an electrostatic latent image having a high resolution of 1200 DPI is to be formed, the number of times a laser beam scans a photoreceptor drum along the main scanning direction is twice the number of times a laser beam scans a photoreceptor drum along the main scanning direction in a case where an electrostatic latent image having a low resolution of 600 DPI is to be formed. Accordingly, the total number of rotation of the polygon mirror required for a single formation of a high-resolution electrostatic latent image is twice the total number of rotation of the polygon mirror required for a single formation of a low-resolution electrostatic latent image.

As such, in order to form a high-resolution electrostatic latent image, the total number of rotation of the polygon mirror should be twice the total number of rotation of the polygon mirror required for formation of a low-resolution electrostatic latent image. That is to say, in order to form a high-resolution electrostatic latent image as fast as a low-resolution electrostatic latent image, it is required to rotate the polygon mirror twice as fast as the rotation speed of the polygon mirror required for formation of the low-resolution electrostatic latent image. In general, however, the maximum rotation speed of the polygon mirror is approximately 50000 rpm. It is thus impossible to rotate the polygon mirror twice as fast as the rotation speed of the polygon mirror required for formation of the low-resolution electrostatic latent image. Hence, there is a limit on acceleration of the speed of forming a high-resolution electrostatic latent image.

Assume, for example, an image forming apparatus that forms an electrostatic latent image on the circumferential surface of a photoreceptor drum by causing one laser beam to scan the photoreceptor drum along the main scanning direction while changing the position of irradiation along the sub scanning direction. When forming an electrostatic latent image having a low resolution of 600 DPI, this image forming apparatus can perform a high-speed image forming operation by setting the polygon mirror to rotate at high speed (50 sheets per minute). However, when forming an electrostatic latent image having a high resolution of 1200 DPI on the photoreceptor drum, this image forming apparatus can only perform a low-speed image formation (25 sheets per minute).

Patent Literature 1 (JP Patent Application Publication No. 2008-26570) discloses an optical scanning device that forms an electrostatic latent image on each of paired photoreceptor drums by using a multi-beam method, according to which a plurality of semiconductor laser beams form optical spots on each of the paired photoreceptor drums. In this optical scanning device, two light source units are disposed while opposing each other with a polygon mirror therebetween, in order to irradiate each of the paired photoreceptor drums with a pair of optical spots.

In the optical scanning device having the above structure, each of the two light source units emits two laser beams that irradiate a corresponding one of the paired photoreceptor drums. If the two optical spots formed on each of the paired photoreceptor drums correspond to a high resolution of 1200 DPI, this optical scanning device can form an electrostatic latent image twice as fast as the speed of forming an electrostatic latent image using one laser beam per photoreceptor drum (for example, 50 sheets per minute).

An electrostatic latent image having a low resolution of 600 DPI can also be formed by using a light source unit having two semiconductor laser elements that generate two optical spots corresponding to a high resolution of 1200 DPI. In this case, only one of the two semiconductor laser elements provided in the light source unit may be driven to form an electrostatic latent image on a photoreceptor drum by using one laser beam.

However, in this case, an image forming operation is performed at the same speed as the speed of forming an electrostatic latent image having a high resolution of 1200 DPI—e.g., 50 sheets per minute. This makes it impossible to form a low-resolution electrostatic latent image faster than the speed of forming a high-resolution electrostatic latent image.

As described above, an image forming apparatus capable of forming a full-color image uses a light source unit corresponding to a high resolution, and thus can form a low-resolution monochrome image only at the same speed as the speed of forming a full-color image. For the above reason, such an image forming apparatus cannot satisfy the user's demand to form a monochrome image faster than the speed of forming a full-color image.

Furthermore, in the optical scanning device disclosed in Patent Literature 1, two light source units are disposed so as to oppose each other with a polygon mirror therebetween. This arrangement requires a large space on both sides of the polygon mirror. In addition, if four photoreceptor drums are disposed to form toner images in the colors Y, M, C and K, respectively, the optical scanning device disclosed in Patent Literature 1 must have two additional light source units, which may result in a significant increase in the size of the optical scanning device.

Patent Literature 2 (JP Patent Application Publication No. H11-14921) discloses an optical scanning device that forms electrostatic latent images having different resolutions on a single photoreceptor drum by switching between two light-emitting units each having a semiconductor laser array with a plurality of laser oscillators. In this optical scanning device, the two semiconductor laser arrays in the light-emitting units correspond to a low resolution and a high resolution, respectively. When an operation for forming a low-resolution image is performed, one of the light-emitting units that has the semiconductor laser array corresponding to a low resolution is used. This way, the operation for forming the low-resolution image can be performed faster than the speed of an operation for forming a high-resolution image.

The optical scanning device disclosed in Patent Literature 2 is associated with a monochrome image forming apparatus for forming two types of electrostatic latent images (i.e., a low-resolution electrostatic latent image and a high-resolution electrostatic latent image) on a single photoreceptor drum. This optical scanning device is structured such that a plurality of laser beams oscillated by the semiconductor laser array provided in each light-emitting unit (light source unit) irradiate a polygon mirror via a beam splitter. However, as a beam splitter is an expensive optical element, any structure incorporating a beam splitter is not economically efficient.

Furthermore, in order to apply the structure of Patent Literature 2, which relates to a monochrome image forming apparatus, to an image forming apparatus capable of forming a full-color image, the structure of Patent Literature 2 must be provided further with three additional photoreceptor drums and light-emitting units (light source units) that each form an electrostatic latent image having a high resolution on a corresponding one of the three photoreceptor drums. To achieve the above structure, the image forming apparatus disclosed in Patent Literature 2 needs to have a space for four light-emitting units corresponding to a high resolution and one light-emitting unit corresponding to a low resolution. This may increase the size of the image forming apparatus.

The following structure has been proposed for an optical scanning device in an image forming apparatus capable of forming a full-color image: as disclosed in Patent Literature 1, instead of disposing a plurality of light source units corresponding to a high resolution on both sides of a polygon mirror so they oppose each other with the polygon mirror therebetween, disposing four light source units on one side of a polygon mirror as disclosed in Patent Literature 1. In this case, the polygon mirror causes the laser beams that are emitted by the four respective light source units and that correspond to a high resolution to proceed along the main scanning direction of the four photoreceptor drums for forming toner images in the colors Y, M, C and K, respectively. Thereafter, these laser beams are reflected toward the four respective photoreceptor drums.

The problem with the optical scanning device having the above structure is that, since the four light source subunits are disposed in a relatively small space on one side of the polygon mirror while being adjacent to one another, it is difficult to secure a space for newly providing the semiconductor laser array corresponding to a low resolution and a beam splitter, which are disclosed in Patent Literature 2.

It is permissible to irradiate the polygon mirror with the laser beam emitted by the semiconductor laser array corresponding to a low resolution by, with use of the beam splitter, causing this laser beam to take the same optical path as the laser beam emitted by the semiconductor laser array corresponding to a high resolution. In this case, however, due to the limit on the positions of the semiconductor laser arrays and the beam splitter in relation to the polygon mirror, it is difficult to secure a space for providing these elements in a downsized optical scanning device. Furthermore, use of the expensive beam splitter reduces economic efficiency.

SUMMARY OF THE INVENTION

The present invention has been conceived in view of the above problems, and aims to provide an optical scanning device that can, due to its compact structure, (i) form a high-resolution electrostatic latent image and (ii) form a low-resolution electrostatic latent image at high speed. The present invention also aims to provide an image forming apparatus comprising the above optical scanning device.

To achieve the above aims, an optical scanning device pertaining to the present invention is an optical scanning device for use in an image forming apparatus that forms a full-color image by overlaying a plurality of images each in a different one of solid colors, the optical scanning device comprising: a plurality of photoreceptors disposed in one-to-one correspondence with the solid colors; a plurality of high-resolution light source units each operable to emit a set of beams that irradiate a corresponding one of the photoreceptors and are distanced from one another by a predetermined distance along a sub scanning direction; a deflection unit; a first optical system operable to direct the sets of beams emitted by the respective high-resolution light source units to the deflection unit; a low-resolution light source unit operable to emit a set of beams that irradiate a predetermined one of the photoreceptors and are distanced from one another by a distance larger than the predetermined distance along the sub scanning direction; and a second optical system operable to, after the sets of beams emitted by the respective high-resolution and low-resolution light source units are directed to and deflected by the deflection unit, direct each of the sets of beams emitted by the respective high-resolution and low-resolution light source units to the corresponding one of the photoreceptors. Here, the low-resolution light source unit, together with the first optical system, is positioned at one side of the deflection unit so as not to physically interfere with any of the high-resolution light source units and the first optical system, and so as to allow the set of beams emitted by the low-resolution light source unit to, after being deflected by the deflection unit and passing through the second optical system, scan an image forming area on the predetermined one of the photoreceptors along a main scanning direction.

An image forming apparatus pertaining to the present invention comprises the above optical scanning device.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes an embodiment of an optical scanning device and an image forming apparatus pertaining to the present invention.

(Schematic Structure of Image Forming Apparatus)

Figure 1:
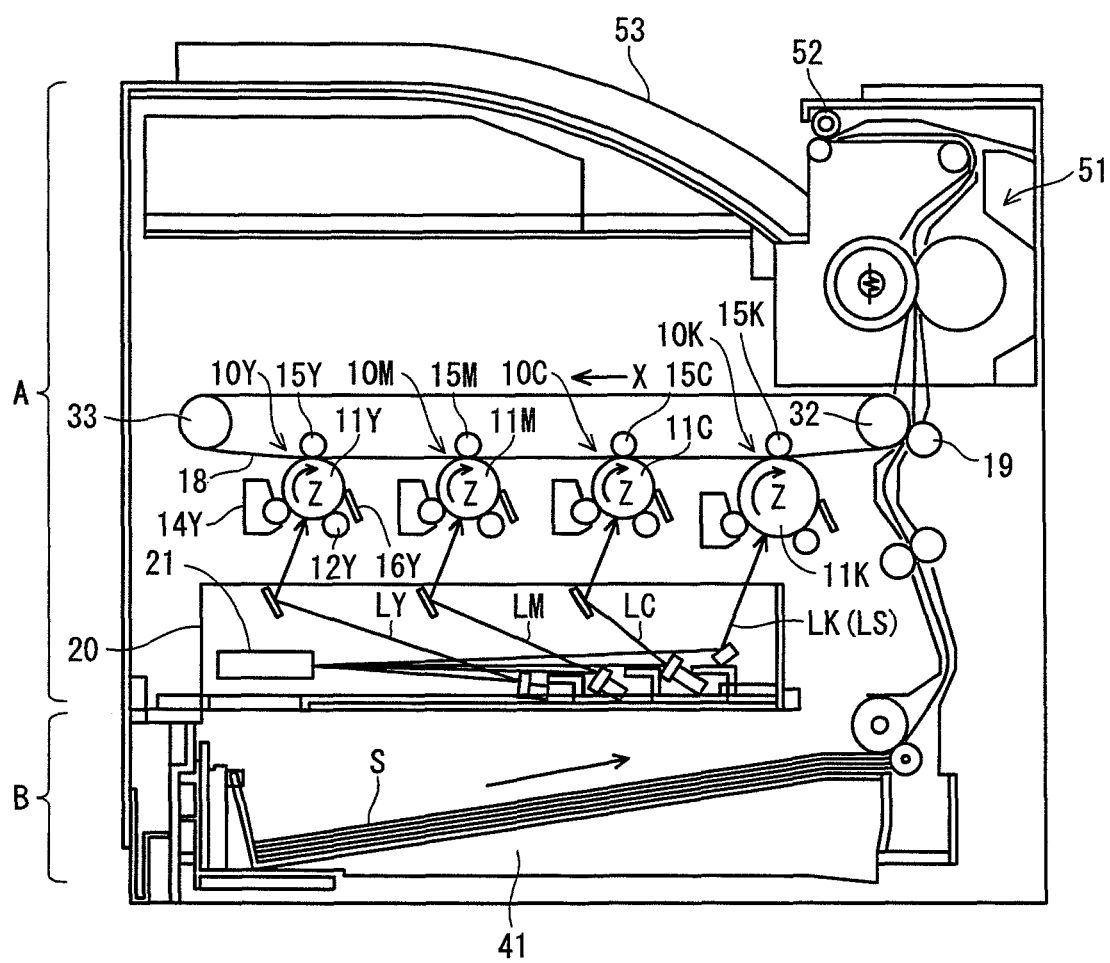
FIG. 1 is a schematic diagram illustrating the structure of a tandem color printer, which is one example of an image forming apparatus comprising an optical scanning device pertaining to an embodiment of the present invention.

FIG. 1 is a schematic diagram illustrating the structure of a tandem color printer (hereinafter, simply "printer"), which is one example of an image forming apparatus comprising an optical scanning device pertaining to an embodiment of the present invention. This color printer forms a full-color image or a monochrome image on a recording sheet (e.g., a recording paper and an OHP sheet) by using commonly-known electrophotography in accordance with, for example, image data input from an external terminal device via a network (e.g., LAN).

The printer comprises an image forming unit A and a paper feeding unit B that is positioned below the image forming unit A. The image forming unit A forms toner images created with yellow (Y), magenta (M), cyan (C) and black (K) toner on the recording sheet. Hereinafter, each of the constituent elements that are associated with these colors may be appended with one of the alphabetical characters Y, M, C and K to indicate the associated color. The paper feeding unit B includes a paper feed cassette 41 containing recording sheets S that are supplied to the image forming unit A.

The image forming unit A includes an intermediate transfer belt 18 that is rotatably hung on a pair of belt rollers 32 and 33 so as to lie horizontally at the substantial center of the printer. The intermediate transfer belt 18 is rotated by a motor (not illustrated) in the direction indicated by arrow X.

Process units 10Y, 10M, 10C and 10K are disposed below the intermediate transfer belt 18. The process units 10Y, 10M, 10C and 10K are arranged in this order along the rotational direction of the intermediate transfer belt 18 (i.e., from left to right when viewed from the front of the image forming apparatus).

The process units 10Y, 10M, 10C and 10K respectively include photoreceptor drums 11Y, 11M, 11C and 11K facing the intermediate transfer belt 18. Toner images created with yellow (Y), magenta (M), cyan (C) and black (K) toner are formed on the respective circumferential surfaces of the photoreceptor drums 11Y, 11M, 11C and 11K.

Axial directions of the photoreceptor drums 11Y, 11M, 11C and 11K all extend along the width direction of the intermediate transfer belt 18 (i.e., the direction perpendicular to the rotational direction of the intermediate transfer belt 18). That is to say, the axial directions of the photoreceptor drums 11Y, 11M, 11C and 11K are parallel to one another.

Note that although the photoreceptor drum 11K of the process unit 10K in the far right has a larger diameter than any other photoreceptor drums 11Y, 11M and 11C, the photoreceptor drums 11Y, 11M, 11C and 11K have an equal length in the axial directions thereof.

An optical scanning device 20 is disposed below the process units 10Y, 10M, 10C and 10K. The optical scanning device 20 forms an electrostatic latent image on each of the process units 10Y, 10M, 10C and 10K by irradiating each of the photoreceptor drums 11Y, 11M, 11C and 11K with a different one of four laser beam pairs LY, LM, LC and LK corresponding to a high resolution (hereinafter, each laser beam pair is referred to as a laser beam group). The optical scanning device 20 is structured to also irradiate the photoreceptor drum 11K with a pair of laser beams LS (laser beam group LS) corresponding to a low resolution. The structure of the optical scanning device 20 will be described later.

Other than the fact that the process units 10Y, 10M, 10C and 10K use different toner colors in forming toner images on the photoreceptor drums 11Y, 11M, 11C and 11K, the process units 10Y, 10M, 10C and 10K have the same functions. For this reason, the following mainly describes the structure of the process unit 10Y, and descriptions of the structure of other process units 10M, 10C and 10K are omitted.

The photoreceptor drum 11Y in the process unit 10Y is rotated in the direction indicated by arrow Z, and is exposed to the laser beam group LY emitted from below by the optical scanning device 20. A charger 12Y is disposed so as to face the photoreceptor drum 11Y in such a manner that along the rotational direction of the photoreceptor drum 11Y, the charger 12Y is positioned upstream relative to an exposed position on the photoreceptor drum 11Y where the photoreceptor drum 11Y is exposed to the laser beam group LY. The charger 12Y uniformly charges the circumferential surface of the photoreceptor drum 11Y before the laser beam group LY irradiates the circumferential surface of the photoreceptor drum 11Y.

Due to the laser beam group LY irradiating the circumferential surface of the photoreceptor drum 11Y, which is uniformly charged by the charger 12Y, an electrostatic latent image is formed on the circumferential surface of the photoreceptor drum 11Y. The process unit 10Y also includes a developer 14Y. Along the rotational direction of the photoreceptor drum 11Y, the developer 14Y is positioned downstream relative to the exposed position on the photoreceptor drum 11Y where the photoreceptor drum 11Y is exposed to the laser beam group LY. The developer 14Y develops the electrostatic latent image formed on the circumferential surface of the photoreceptor drum 11Y using toner in the color Y.

A primary transfer roller 15Y is positioned above the process unit 10Y so as to face the photoreceptor drum 11Y via the intermediate transfer belt 18. The primary transfer roller 15Y is attached to the image forming unit A. The primary transfer roller 15Y forms an electric field between itself and the photoreceptor drum 11Y upon application of a transfer bias voltage thereto. Due to the effect of the electric field, the toner image on the photoreceptor drum 11Y is transferred to the intermediate transfer belt 18 (primary transfer).

Note that primary transfer rollers 15M, 15C and 15K are positioned above other process units 10M, 10C and 10K so as to face the photoreceptor drums 11M, 11C and 11K via the intermediate transfer belt 18, respectively. The toner images formed on the respective photoreceptor drums 11M, 11C and 11K are transferred to the intermediate transfer belt 18 (primary transfer) due to the effect of the electric field formed between the primary transfer rollers 15M, 15C and 15K and the photoreceptor drums 11M, 11C and 11K.

In a case where a full-color image is to be formed in the image forming unit A, the process units 10Y, 10M, 10C and 10K perform the image forming operation at different timings from one another, so that the toner images formed on the respective photoreceptor drums 11Y, 11M, 11C and 11K are transferred to and layered on the same area on the intermediate transfer belt 18.

On the other hand, in a case where a monochrome image is to be formed in the image forming unit A, only the process unit 10K corresponding to toner in the color K operates. As a result of the photoreceptor drum 11K in the process unit 10K being irradiated with the laser beam group LS corresponding to a low resolution, an electrostatic latent image is formed on the photoreceptor drum 11K, and a toner image is formed on the photoreceptor drum 11K with use of toner in the color K (hereinafter, a laser beam group corresponding to a low resolution and a laser beam group corresponding to a high resolution are referred to as a low-resolution laser beam group and a high-resolution laser beam group, respectively). Then, the primary transfer roller 15K, which is disposed so as to face the process unit 10K, transfers the toner image formed on the photoreceptor drum 11K to a predetermined area on the intermediate transfer belt 18.

A cleaning member 16Y provided in the process unit 10Y cleans the circumferential surface of the photoreceptor drum 11Y from which the toner image has been transferred (primary transfer). The same goes for other process units 10M, 10C and 10K.

While the toner image(s) is formed on the intermediate transfer belt 18, a secondary transfer roller 19 is pressed against a downstream end of the intermediate transfer belt 18 along the conveyance direction of the intermediate transfer belt 18 (i.e., the right end of the intermediate transfer belt 18 when viewed from the front of the image forming apparatus). A transfer nip is formed between the intermediate transfer belt 18 and the secondary transfer roller 19. A transfer bias voltage is applied to the secondary transfer roller 19. Consequently, an electric field is formed between the secondary transfer roller 19 and the intermediate transfer belt 18.

A recording sheet S fed from the paper feed cassette 41 in the paper feeding unit B is supplied to the transfer nip formed between the secondary transfer roller 19 and the intermediate transfer belt 18. Due to the effect of the electric field formed between the secondary transfer roller 19 and the intermediate transfer belt 18, the toner image(s) transferred to the intermediate transfer belt 18 is transferred to the recording sheet S (secondary transfer) passing through the transfer nip.

After passing through the transfer nip, the recording sheet S is conveyed to a fixing device 51, which is disposed above the secondary transfer roller 19. The fixing device 51 fixes the unfixed toner image(s) on the recording sheet S by heat and pressure. Thereafter, the recording sheet S on which the toner image has been fixed is discharged onto a discharge tray 53 by a discharge roller 52.

(Structure of Optical Scanning Device)

As shown in FIG. 1, the optical scanning device 20 is positioned at the bottom of the image forming unit A. When viewed from the front of the image forming apparatus, the optical scanning device 20 is in the vicinity of the left wall of the image forming apparatus.

Figure 2:
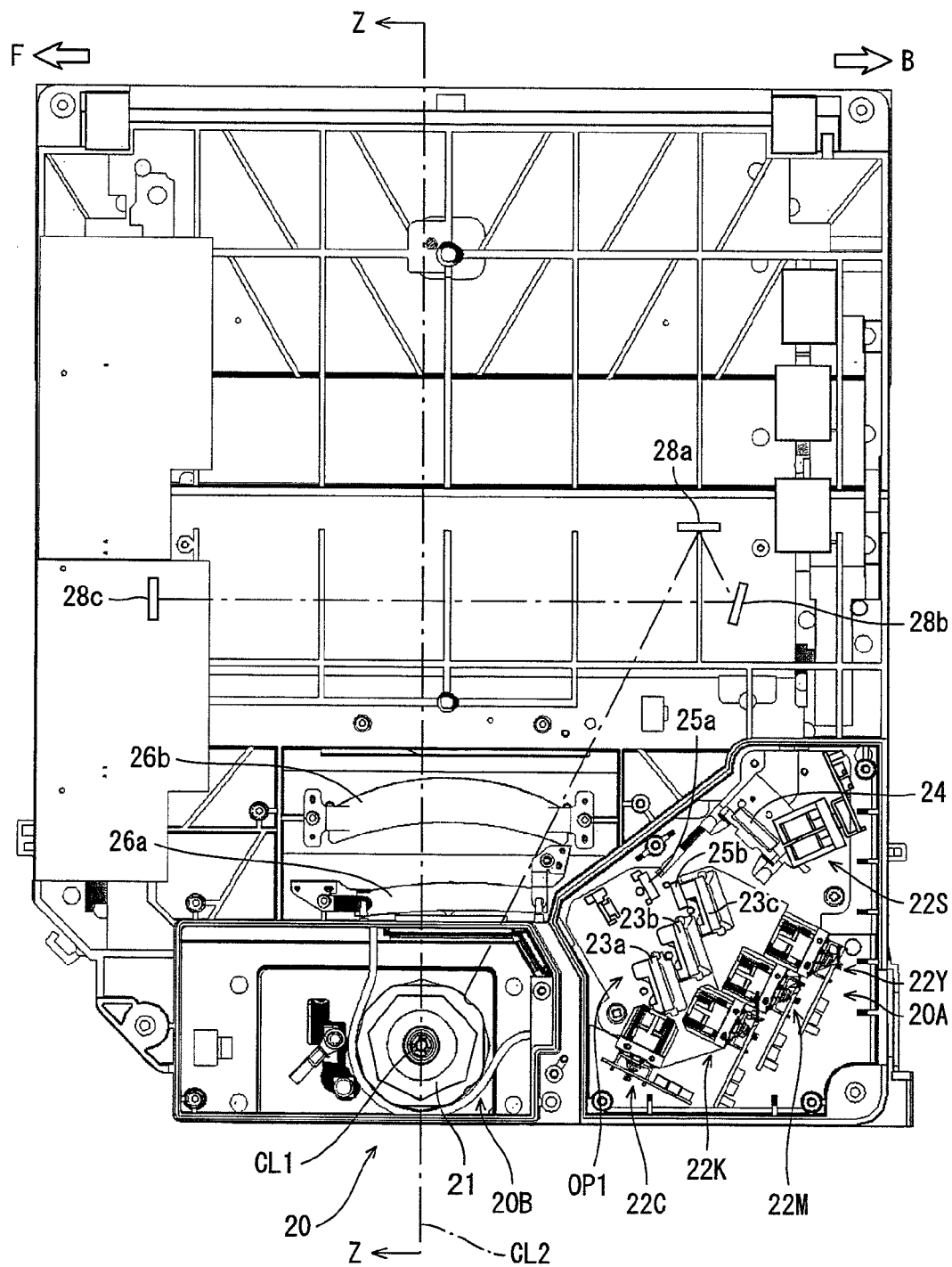
FIG. 2 is a perspective view as seen from the bottom of the image forming apparatus, illustrating the structure of main components of the optical scanning device.
Figure 3:
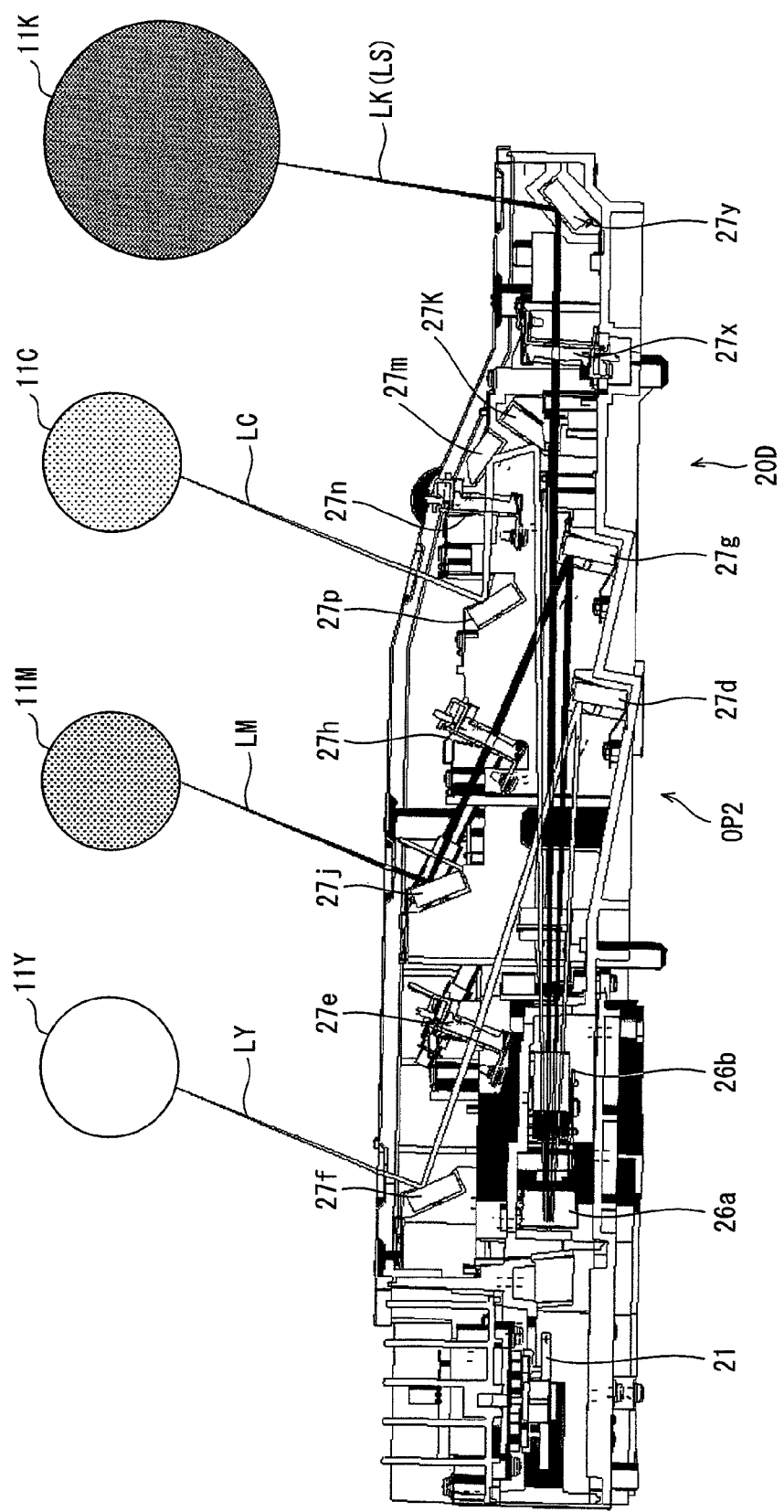
FIG. 3 shows a cross section taken along a line Z-Z in FIG. 2.

FIG. 2 is a perspective view as seen from the bottom of the image forming apparatus, illustrating the structure of main components of the optical scanning device 20. FIG. 3 shows a cross section taken along a line Z-Z in FIG. 2. Note that in FIG. 2, the direction of arrow F indicates the front of the image forming apparatus, whereas the direction of arrow B indicates the back of the image forming apparatus. FIG. 3 shows respective positions of the photoreceptor drums 11Y, 11M, 11C and 11K in the process units 10Y, 10M, 10C and 10K, which are disposed above the optical scanning device 20.

As shown in FIG. 2, the optical scanning device 20 is composed of a light source unit 20A, an optical scanning unit 20B, and a light reflection unit 20D (see FIG. 3). The light source unit 20A is positioned in the back left corner of the image forming apparatus. The optical scanning unit 20B is positioned closer to the front of the image forming apparatus than the light source unit 20A is. The light reflection unit 20D is positioned on the right side of the optical scanning unit 20B below the process units 10Y, 10M, 10C and 10K.

The light source unit 20A includes light source subunits 22Y, 22M, 22C and 22K and a low-resolution light source subunit 22S. The light source subunits 22Y, 22M, 22C and 22K respectively generate high-resolution laser beam groups LY, LM, LC and LK (see FIGS. 1 and 3) for forming an electrostatic latent image having a high resolution of 1200 DPI on each of the photoreceptor drums 11Y, 11M, 11C and 11K (the positions of which are illustrated in FIG. 3). The low-resolution light source subunit 22S generates one low-resolution laser beam group LS (see FIGS. 1 and 3) for forming an electrostatic latent image having a low resolution of 600 DPI on the photoreceptor drum 11K. The light source unit 20A also includes a first optical system OP1 that directs the high-resolution laser beam groups LY, LM, LC and LK to the optical scanning unit 20B. The first optical system OP1 will be described later.

Each of the high-resolution laser beam groups LY, LM, LC and LK and the low-resolution laser beam group LS includes a pair of laser beams. The pair of laser beams has the same distance therebetween along the sub scanning direction for all of the high-resolution laser beam groups LY, LM, LC and LK when irradiating a corresponding one of photoreceptor drums 11Y, 11M, 11C and 11K. However, the distance between the pair of laser beams in the low-resolution laser beam group LS is larger than the distance between the pair of laser beams in each of the high-resolution laser beam groups LY, LM, LC and LK in the sub scanning direction.

As shown in FIG. 2, in the optical scanning unit 20B, a polygon mirror 21 is disposed as a deflector that deflects each of the laser beam groups LY, LM, LC and LK and the low-resolution laser beam group LS toward the light reflection unit 20D, the laser beam groups LY, LM, LC and LK being emitted by the light source unit 20A and respectively corresponding to the colors Y, M, C and K. The polygon mirror 21 is a rotatable body with a plurality of (in the present embodiment, seven) mirror surfaces. After the high-resolution laser beam groups LY, LM, LC and LK irradiate each mirror surface while the polygon mirror 21 is rotating, the polygon mirror 21 causes the laser beam groups LY, LM, LC and LK to sweep along the main scanning direction, which is the axial direction of each of the photoreceptor drums 11Y, 11M, 11C and 11K.

Similarly, after the low-resolution laser beam group LS irradiates each mirror surface of the polygon mirror 21 while the polygon mirror 21 is rotating, the polygon mirror 21 causes the low-resolution laser beam group LS to sweep along the main scanning direction, which is the axial direction of the photoreceptor drum 11K.

As shown in FIG. 3, the light reflection unit 20D includes a second optical system. The second optical system reflects the laser beam groups LY, LM, LC and LK, which are caused to sweep along the main scanning direction by the polygon mirror 21 in the optical scanning unit 20B, toward the photoreceptor drums 11Y, 11M, 11C and 11K, respectively. The second optical system also reflects the low-resolution laser beam group LS, which is caused to sweep along the main scanning direction, toward the photoreceptor drum 11K. The second optical system OP2 will be described later.

Note that as shown in FIG. 3, the high-resolution laser beam groups LY, LM, LC and LK, which are caused to sweep along the main scanning direction by the polygon mirror 21, have the following positional relationship. The path taken by the laser beam group LC is the highest in the vertical direction. Following that, the path taken by the laser beam group LK, the path taken by the laser beam group LM, and the path taken by the laser beam group LY descend in this order in the vertical direction.

The polygon mirror 21 is disposed in the optical scanning unit 20B so its rotational central axis CL1 stands vertically. The rotational central axis CL1 of the polygon mirror 21 intersects with a horizontal straight line CL2 that lies horizontally along a vertical plane including all of the central positions of the photoreceptor drums 11Y, 11M, 11C and 11K along the main scanning direction.

Figure 4:
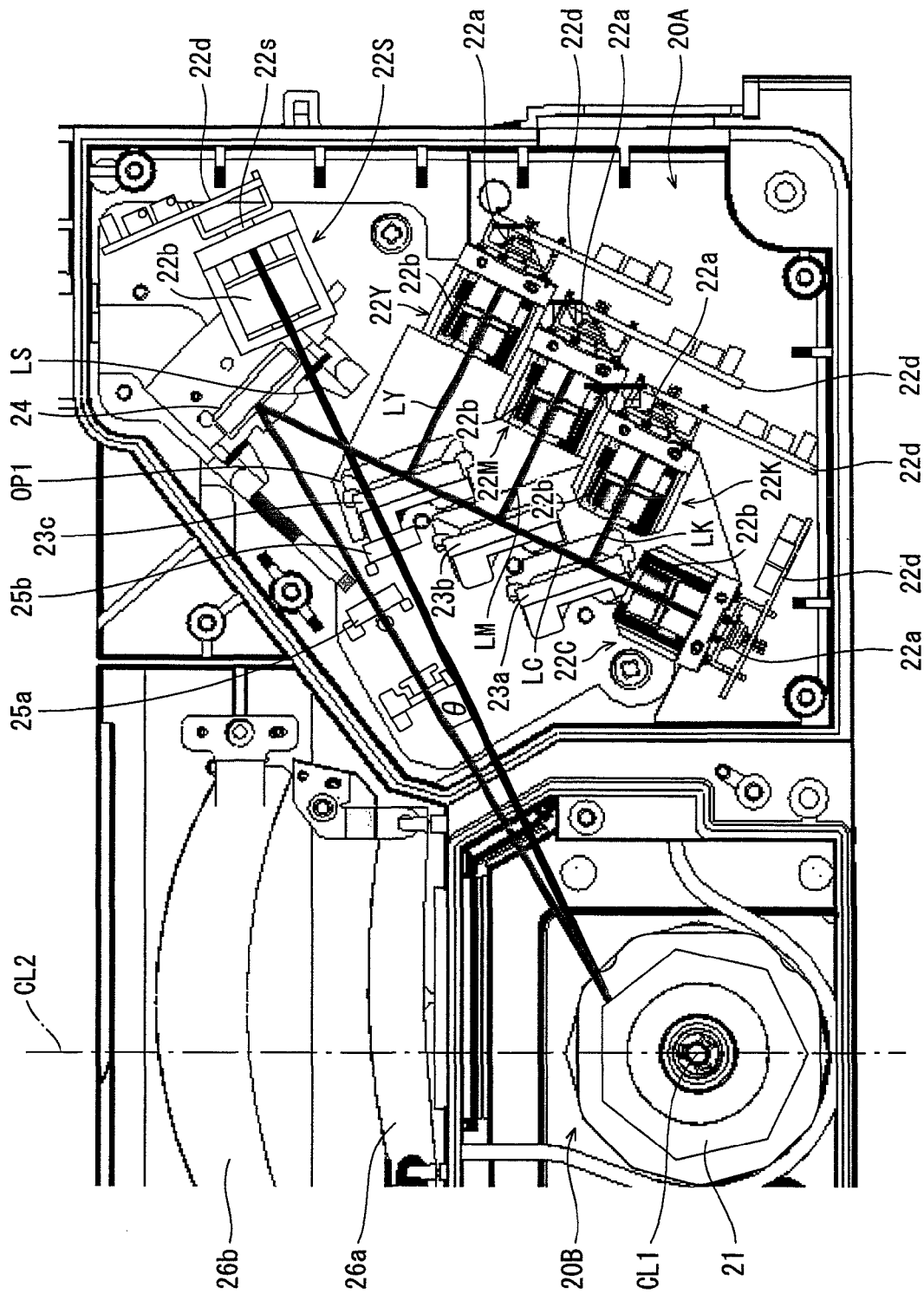
FIG. 4 is an enlarged view of main parts of a light source unit and an optical scanning unit shown in the perspective view of FIG. 2.

FIG. 4 is an enlarged view of parts of the light source unit 20A and the optical scanning unit 20B shown in FIG. 2. Of all the high-resolution light source subunits 22Y, 22M, 22C and 22K in the light source unit 20A, the light source subunit 22C that emits the laser beam group LC is positioned at the front of the light source unit 20A, i.e., in the vicinity of the polygon mirror 21.

The light source subunit 22C is composed of a multibeam semiconductor laser element 22a that emits two laser beams and a collimator lens 22b that parallelizes the two laser beams emitted by the semiconductor laser element 22a.

The semiconductor laser element 22a in the light source subunit 22C is mounted on a circuit board 22d that stands vertically. The circuit board 22d extends along a direction that is perpendicular to the optical axis of the collimator lens 22b. A part of the circuit board 22d extends toward one side of the direction of the optical axis of the collimator lens 22b (toward a direction moving away from the polygon mirror 21).

The light source subunit 22C is positioned so that the laser beam group LC emitted by the semiconductor laser elements 22a (i) proceeds toward a direction moving away from the polygon mirror 21 and (ii) is inclined with respect to the horizontal straight line CL2 at an angle of approximately 30°, the horizontal straight line CL2 being perpendicular to the rotational central axis CL1 of the polygon mirror 21.

The light source unit 20A also includes a first reflective mirror 24 that reflects the laser beam group LC, which is emitted linearly by the light source subunit 22C, toward the polygon mirror 21. The first reflective mirror 24 in the light source unit 20A is positioned between the center and the back of the image forming apparatus while opposing the light source subunit 22C. The laser beam group LC emitted by the light source subunit 22C directly irradiates the first reflective mirror 24.

The first reflective mirror 24 is inclined with respect to the horizontal straight line CL2, which is perpendicular to the rotational central axis CL1 of the polygon mirror 21, so that the laser beam group LC has an angle of incidence of approximately 15° with respect to the first reflective mirror 24. The laser beam group LC reflected by the first reflective mirror 24 linearly irradiates the polygon mirror 21.

A path taken by the linearly-extending laser beam group LC from the light source subunit 22C to the first reflective mirror 24 is herein referred to as an irradiated area. The light source subunits 22K, 22M and 22Y, which respectively emit high-resolution laser beam groups LK, LM and LY, are positioned so as to oppose the polygon mirror 21 via the irradiated area of the laser beam group LC.

The light source subunits 22K, 22M and 22Y are arranged in this order along the irradiated area of the laser beam group LC, with the position of the light source subunit 22K being the most upstream and the position of the light source subunit 22Y being the most downstream along the direction of irradiation by the laser beam group LC. Of all the high-resolution light source subunits, the light source subunit 22K is positioned closest to the irradiated area of the laser beam group LC. Following that, the light source subunits 22M and 22Y are the second and third closest to the irradiated area of the laser beam group LC, respectively.

As with the light source subunit 22C, the light source subunits 22K, 22M and 22Y each include a semiconductor laser element 22a that emits two laser beams and a collimator lens 22b that parallelizes the two laser beams emitted by the semiconductor laser element 22a.

In each of the light source subunits 22K, 22M and 22Y, the semiconductor laser element 22a is mounted on a circuit board 22d that stand vertically. Each circuit board 22d extends along a direction that is perpendicular to the optical axis of the corresponding collimator lens 22b. A part of each circuit board 22d extends so as to be positioned upstream relative to the corresponding collimator lens 22b along the direction of irradiation by the laser beam group LC.

The light source subunits 22K, 22M and 22Y are structured such that the laser beam groups LK, LM and LY emitted by the semiconductor laser elements 22a therein proceed toward the irradiated area of the laser beam group LC. The collimator lenses 22b in the light source subunits 22K, 22M and 22Y are positioned such that their optical axes are parallel to one another. Furthermore, the collimator lenses 22b in the light source subunits 22K and 22C are positioned such that their optical axes are perpendicular to each other.

The tip of the collimator lens 22b in the light source subunit 22K, which is positioned adjacent to the light source subunit 22C, is positioned adjacent to the tip of the collimator lens 22b in the light source subunit 22C. Accordingly, the stated part of the circuit board 22d in the light source subunit 22K, which extends so as to be positioned upstream relative to the collimator lens 22b along the direction of irradiation by the laser beam group LC, opposes the light source subunit 22C.

The collimator lens 22b in the light source subunit 22M, which is positioned adjacent to the light source subunit 22K, is positioned adjacent to the collimator lens 22b in the light source subunit 22K. Accordingly, the stated part of the circuit board 22d in the light source subunit 22M, which extends so as to be positioned upstream relative to the collimator lens 22b along the direction of irradiation by the laser beam group LC, opposes the light source subunit 22K. Similarly, the collimator lens 22b in the light source subunit 22Y, which is positioned adjacent to the light source subunit 22M, is positioned adjacent to the collimator lens 22b in the light source subunit 22M. Accordingly, the stated part of the circuit board 22d in the light source subunit 22Y, which extends so as to be positioned upstream relative to the collimator lens 22b along the direction of irradiation by the laser beam group LC, opposes the light source subunit 22M.

With the above structure, the light source subunits 22C, 22K, 22M and 22Y are compactly arranged on one side of the polygon mirror 21 while being adjacent to one another.

Figure 5:
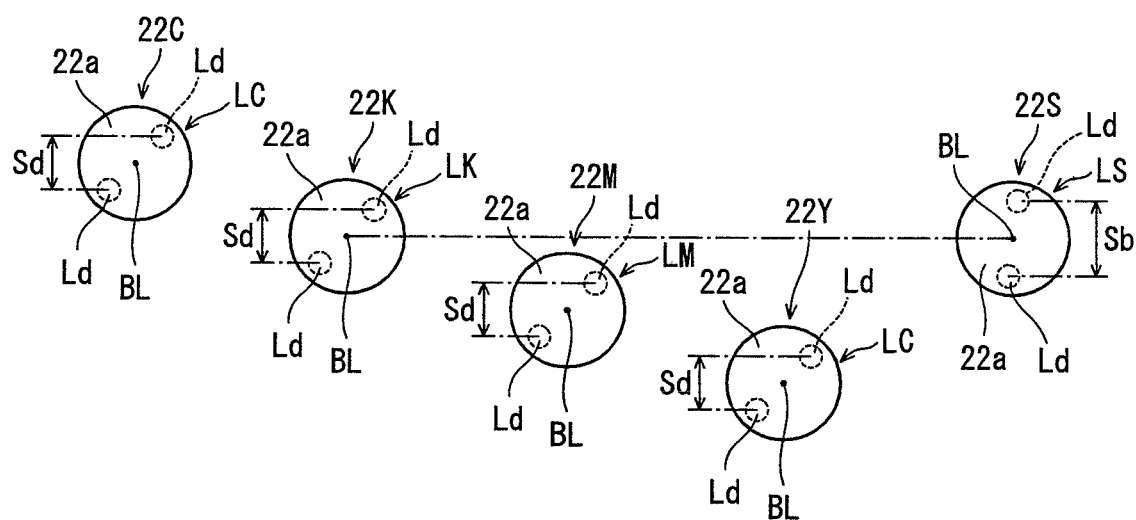
FIG. 5 is a schematic diagram illustrating the structure of a semiconductor laser element provided in each of light source subunits used in the optical scanning device.

FIG. 5 is a schematic diagram illustrating the structure of the semiconductor laser elements 22a provided in the light source subunits 22C, 22K, 22M and 22Y.

In each of the light source subunits 22C, 22K, 22M and 22Y, the semiconductor laser element 22a is mounted on the circuit board 22d in such a manner that a plane including the optical axes of the pair of laser beams Ld constituting the corresponding laser beam group (LC, LK, LM or LY) is inclined with respect to a horizontal plane at a predetermined angle, so as to make a vertical distance Sd between the pair of laser beams Ld equal to a predetermine value that has been preset to form a high-resolution image.

More specifically, the two laser beams Ld emitted by each semiconductor laser element 22a are set so that when they irradiate the corresponding photoreceptor drum (11Y, 11M, 11C or 11K), the distance Sd therebetween on the circumferential surface of the corresponding photoreceptor drum (11Y, 11M, 11C or 11K) along the circumferential direction (i.e., along the sub scanning direction) is 21 μm.

Note that the two laser beams Ld emitted by each semiconductor laser element 22a are parallel to each other substantially all the way through their optical paths. Therefore, in FIGS. 2 to 4, each of the laser beam groups LC, LK, LM and LY is illustrated as one line representing the central axis BL of the laser beam group (i.e., the two laser beams emitted by the corresponding semiconductor laser element 22a). Hereinafter, the central axis of a laser beam group is referred to as a beam central axis.

As shown in FIG. 5, the semiconductor laser element 22a in the light source subunit 22C is at the highest position among all the semiconductor laser elements 22a. Following that, the semiconductor laser element 22a in the light source subunit 22K, the semiconductor laser element 22a in the light source subunit 22M, and the semiconductor laser element 22a in the light source subunit 22Y descend in height in the stated order.

Therefore, the irradiated area of the laser beam group LC emitted by the light source subunit 22C is at the highest position among all the irradiated areas. The irradiated area of the laser beam group LK, the irradiated area of the laser beam group LM and the irradiated area of the laser beam group LY are all positioned below the irradiated area of the laser beam group LC and descend in height in the stated order.

As shown in FIG. 4, a reflective mirror 23a for the color K, a reflective mirror 23b for the color M, and a reflective mirror 23c for the color Y are arranged along and below the irradiated area of the laser beam group LC in the stated order, with the position of the reflective mirror 23a being the most upstream and the position of the reflective mirror 23c being the most downstream along the direction of irradiation by the laser beam group LC. Here, the reflective mirrors 23a, 23b and 23c respectively oppose the collimator lens 22b in the light source subunit 22K, the collimator lens 22b in the light source subunit 22M, and the collimator lens 22b in the light source subunit 22Y.

The reflective mirrors 23a, 23b and 23c descend in height in the stated order, and respectively reflect the laser beam groups LK, LM and LY emitted by the light source subunits 22K, 22M and 22Y toward the first reflective mirror 24.

Accordingly, the laser beam group LC irradiates the first reflective mirror 24 without physically interfering with any of the reflective mirrors 23a, 23b and 23c. The laser beam group LK irradiates the first reflective mirror 24 without physically interfering with any of the reflective mirrors 23b and 23c. The laser beam group LM irradiates the first reflective mirror 24 without physically interfering with the reflective mirror 23c.

The reflective mirrors 23a, 23b and 23c are each inclined at an angle of 45° with respect to the direction of irradiation of the laser beam group LC, so as to reflect the emitted laser beam groups LK, LM and LY toward the first reflective mirror 24.

The reflective mirrors 23a, 23b and 23c respectively reflect the emitted laser beam groups LK, LM and LY toward the first reflective mirror 24, in such a manner that the laser beam groups LK, LM and LY bend at a 90° angle upon reflection. Thereafter, the laser beam groups LK, LM and LY are incident on the first reflective mirror 24.

The laser beam groups LC, LK, LM and LY are incident on the first reflective mirror 24 while being parallel to one another, and descend in height in the stated order along the vertical direction. Once the laser beam groups LC, LK, LM and LY have been reflected by the first reflective mirror 24, they are focused by a first cylindrical lens 25a onto the substantially same position on each mirror surface of the rotating polygon mirror 21.

In this case, the beam central axes BL (see FIG. 5) of the laser beam groups LC, LK, LM and LY respectively have angles of incidence of +2°, +2⁄3°, −2⁄3° and −2° with respect to the vertical direction (sub scanning direction), the vertical direction being traced through the light focus point on each mirror surface of the rotating polygon mirror 21 (note, "+" denotes the angle of incidence from above, whereas "−" denotes the angle of incidence from below). These angles of incidence do not change even if the polygon mirror 21 rotates.

On the other hand, the laser beam groups LC, LK, LM and LY have an equal angle of incidence (hereinafter referred to as a first angle of incidence) with respect to the scanning direction, the scanning direction being traced through the light focus point on each mirror surface of the polygon mirror 21. Although the values of the first angles of incidence of the laser beam groups LC, LK, LM and LY change sequentially as the polygon mirror 21 rotates, these values will always have an equal amount of change. Accordingly, the values of the first angles of incidence of the laser beam groups LC, LK, LM and LY are always the same with one another.

The first reflective mirror 24, the reflective mirrors 23a, 23b and 23c, the first cylindrical lens 25a and the like provided in the light source unit 20A constitute the first optical system OP1 for directing the laser beam groups LC, LK, LM and LY respectively emitted by the high-resolution light source subunits 22C, 22K, 22M and 22Y toward the polygon mirror 21.

As shown in FIG. 4, in the light source unit 20A, the low-resolution light source subunit 22S that emits the low-resolution laser beam group LS corresponding to a resolution of 600 DPI is disposed in the vicinity of the first reflective mirror 24. The low-resolution light source subunit 22S is positioned closer to the back of the image forming apparatus than the first reflective mirror 24 is, in a space between the first reflective mirror 24 and the light source subunit 22Y.

As with the high-resolution light source subunits 22C, 22K, 22M and 22Y, the low-resolution light source subunit 22S includes a semiconductor laser element 22s that emits a pair of laser beams, and a collimator lens 22b (see FIG. 4) that parallelizes the pair of laser beams emitted by the semiconductor laser element 22s. A circuit board 22d is attached to the collimator lens 22b in the following manner. The circuit board 22d stands vertically and extends along a direction that is perpendicular to the optical axis of the collimator lens 22b. A part of the circuit board 22d extends further from the collimator lens 22b while opposing the first reflective mirror 24.

As shown in FIG. 5, in the low-resolution light source subunit 22S, the semiconductor laser element 22s is mounted on the circuit board 22d in such a manner that a plane including the optical axes of the pair of laser beams Ld emitted thereby is inclined with respect to a horizontal plane at a predetermined angle, so as to make a vertical distance Sb between the pair of laser beams Ld equal to a predetermine value that has been preset to form a low-resolution image.

The pair of laser beams Ld emitted by the semiconductor laser element 22s in the low-resolution light source subunit 22S is set to have a distance Sb of 42 μm therebetween along the circumferential direction of the circumferential surface of the photoreceptor drum 11K (sub scanning direction) when irradiating the circumferential surface of the photoreceptor drum 11K.

The semiconductor laser element 22s in the low-resolution light source subunit 22S is at the same height as the semiconductor laser element 22a in the light source subunit 22K in a vertical direction.

As for the low-resolution laser beam group LS, the optical axes of the pair of laser beams Ld, which have a predetermined distance therebetween, are parallel to each other substantially all the way through their optical paths. Accordingly, in FIGS. 2 to 4, the pair of laser beams Ld in the low-resolution laser beam group LS are illustrated as one beam representing the central axis BL (see FIG. 5) of the pair of laser beams Ld. Hereinafter, the central axis BL of the pair of laser beams Ld is referred to as a beam central axis BL.

As shown in FIG. 4, the low-resolution light source subunit 22S is positioned so as not to physically interfere with any of the light source subunits 22C, 22K, 22M and 22Y and the first optical system OP1. This is to allow the low-resolution laser beam group LS (the pair of laser beams Ld) to linearly irradiate each mirror surface of the polygon mirror 21 via a second cylindrical lens 25b after passing through the collimator lens 22b.

To this end, the semiconductor laser element 22s in the low-resolution light source subunit 22S is at the same height as the semiconductor laser element 22a in the light source subunit 22K.

Accordingly, the irradiated area of the low-resolution laser beam group LS emitted by the low-resolution light source subunit 22S is positioned above the irradiated area of the laser beam group LY emitted by the light source subunit 22Y. For this reason, even though the reflective mirror 23c that reflects the laser beam group LY emitted by the light source subunit 22Y toward the first reflective mirror 24 is positioned in the vicinity of the first reflective mirror 24, the irradiated area of the low-resolution laser beam group LS is positioned above the reflective mirror 23c. Consequently, there is no possibility that the low-resolution laser beam group LS physically interfere with the reflective mirror 23c.

Furthermore, the low-resolution light source subunit 22S is positioned such that the low-resolution laser beam group LS emitted by the collimator lens 22b is focused by the second cylindrical lens 25b onto the substantially same position on each mirror surface of the polygon mirror 21 as the laser beam group LK.

For this reason, the low-resolution laser beam group LS emitted by the low-resolution light source subunit 22S has a second angle of incidence with respect to the main scanning direction (horizontal direction) traced through the light focus point on each mirror surface of the polygon mirror 21, the second angle of incidence being slightly larger than but as close as possible to the first angle of incidence of the laser beam group LK.

The low-resolution light source subunit 22S is therefore positioned in the vicinity of the first reflective mirror 24 in a space between the first reflective mirror 24 and the high-resolution light source subunit 22Y positioned in the vicinity of the first reflective mirror 24.

On each mirror surface of the rotating polygon mirror 21, the low-resolution laser beam group LS is focused onto the same position as the laser beam group LK. However, the second angle of incidence of the low-resolution laser beam group LS with respect to the main scanning direction (horizontal direction) is always larger than the first angle of incidence of the laser beam group LK with respect to the main scanning direction (horizontal direction). Hence, after the low-resolution laser beam group LS and the laser beam group LK are reflected by the polygon mirror 21, the region scanned by the low-resolution laser beam group LS along the main scanning direction is closer to the front of the image forming apparatus than the region scanned by the laser beam group LK along the main scanning direction is.

The high-resolution laser beam groups LC, LK, LM and LY have an equal first angle of incidence with respect to the main scanning direction (horizontal direction) traced through the light focus point on each mirror surface of the polygon mirror 21, but have different angles of incidence from one another with respect to the sub scanning direction (vertical direction) traced through the light focus point on each mirror surface of the rotating polygon mirror 21. Therefore, due to each mirror surface of the polygon mirror 21, the high-resolution laser beam groups LC, LK, LM and LY proceed at various angles with respect to the sub scanning direction as shown in FIG. 3. After the laser beam groups LY, LM, LC and LK are reflected by each mirror surface of the polygon mirror 21, they pass through scanning lenses 26a and 26b provided in the optical scanning unit 20B and then respectively irradiate the photoreceptor drums 11Y, 11M, 11C and 11K by way of the second optical system OP2 provided in the light reflection unit 20D.

After passing through the scanning lenses 26a and 26b, the laser beam group LY (i) is reflected by a mirror 27d for the color Y disposed in the light reflection unit 20D, (ii) passes through a scanning lens 27e for the color Y, (iii) is reflected by a mirror 27f for the color Y, and (iv) irradiates the photoreceptor drum 11Y. After passing through the scanning lenses 26a and 26b, the laser beam group LM (i) is reflected by a mirror 27g for the color M disposed in the light reflection unit 20D, (ii) passes through a scanning lens 27h for the color M, (iii) is reflected by a mirror 27j for the color M, and (iv) irradiates the photoreceptor drum 11M.

After passing through the scanning lenses 26a and 26b, the laser beam group LC (i) is reflected by a pair of mirrors 27k and 27m for the color C disposed in the light reflection unit 20D, (ii) passes through a scanning lens 27n for the color C, (iii) is reflected by a mirror 27p for the color C, and (iv) irradiates the photoreceptor drum 11C. After passing through the scanning lenses 26a and 26b, the laser beam group LK (i)

passes through a scanning lens 27x for the color K disposed in the light reflection unit 20D, (ii) is reflected by a mirror 27y for the color K, and (iii) irradiates the photoreceptor drum 11K.

The beam central axis of the low-resolution laser beam group LS and the beam central axis of the laser beam group LK have an equal angle of incidence with respect to the sub scanning direction traced through the light focus point on each mirror surface of the polygon mirror 21. Thus, as with the laser beam group LK, the light reflection unit 20D causes the low-resolution laser beam group LS to (i) pass through the scanning lens 27x, (ii) be reflected by the mirror 27y, and (iii) irradiate the photoreceptor drum 11K.

The mirror 27d, the scanning lens 27e, the mirror 27f, the pair of mirrors 27g and 27j, the scanning lens 27h, the pair of mirrors 27k and 27m, the scanning lens 27n, the mirror 2'7p, the scanning lens 27x, and the mirror 27y constitute the second optical system OP2.

Each of the laser beam groups LY, LM, LC and LK scans the entire image forming area on a corresponding one of the photoreceptor drums 11Y, 11M, 11C and 11K along the main scanning direction. On the photoreceptor drum 11K, the region scanned by the low-resolution laser beam group LS along the main scanning direction is closer to the front of the image forming apparatus than the region scanned by the laser beam group LK along the main scanning direction is.

However, the second angle of incidence of the low-resolution laser beam group LS is set with respect to the main scanning direction traced through the light focus point on each mirror surface of the polygon mirror 21, so that the low-resolution laser beam group LS scans the entire image forming area on the photoreceptor drum 11K along the main scanning direction. As a result, on the photoreceptor drum 11K, the region scanned by the low-resolution laser beam group LS is closer to the front of the image forming apparatus than the region scanned by the laser beam group LK is (here, the laser beam group LK scans the photoreceptor drum 11K along the main scanning direction with the horizontal straight line CL2 serving as a central axis of scanning, at an angle that falls within a predetermined angle range). However, the low-resolution laser beam group LS can scan the entire image forming area on the photoreceptor drum 11K along the main scanning direction.

As shown in FIG. 2, in the light reflection unit 20D, a synchronous signal detection sensor 28c is disposed in the vicinity of the front of the image forming apparatus. After passing through the scanning lenses 26a and 26b in the optical scanning unit 20B, the laser beam group LK is reflected by a pair of reflective mirrors 28a and 28b in order at a predetermined timing, and then irradiates the synchronous signal detection sensor 28c. The laser beam group LK irradiates the synchronous signal detection sensor 28c when the region scanned thereby on the photoreceptor drum 11K is closer to the back of the image forming apparatus than the image forming area on the photoreceptor drum 11K is upon being reflected by each mirror surface of the polygon mirror 21.

The synchronous signal detection sensor 28c is configured to receive the low-resolution laser beam group LS after the low-resolution laser beam group LS is reflected by the pair of reflective mirrors 28a and 28b in order when the region scanned by the low-resolution laser beam group LS is closer to the back of the image forming apparatus than the image forming area on the photoreceptor drum 11K is. Modulation driving of the semiconductor laser elements 22a in the light source subunits 22C, 22K, 22M and 22Y and the semiconductor laser element 22s in the low-resolution light source subunit 22S is started in accordance with corresponding image data (high resolution or low resolution), based on the timings when the synchronous signal detection sensor 28c receives the laser beam group LK and the low-resolution laser beam group LS. Thereafter, image data (electrostatic latent image) is written on the photoreceptor drum 11K.

In the optical scanning device 20 having the above structure, when a full-color image is to be formed, a pair of laser beams Ld is emitted by each of the four high-resolution light source subunits 22C, 22K, 22M and 22Y as a result of driving the semiconductor laser elements 22a in the four high-resolution light source subunits 22C, 22K, 22M and 22Y. The laser beam groups LC, LK, LM and LY, each of which includes the pair of laser beams Ld, are reflected by the first reflective mirror 24 and irradiate each mirror surface of the rotating polygon mirror 21 via the first cylindrical lens 25a.

The laser beam groups LC, LK, LM and LY have different angles of incidence from one another with respect to the sub scanning direction traced through the light focus point on each mirror surface of the polygon mirror 21. However, the laser beam groups LC, LK, LM and LY all have the same first angle of incidence with respect to the main scanning direction traced through the light focus point on each mirror surface of the polygon mirror 21. Therefore, along the main scanning direction, each of the laser beam groups LC, LK, LM and LY synchronously scans the same region on the circumferential surface of a corresponding one of the photoreceptor drums 11Y, 11M, 11C and 11K. As a result, the image forming areas on the circumferential surfaces of the photoreceptor drums 11Y, 11M, 11C and 11K are each exposed to beam spots created by the pair of laser beams Ld.

In this case, in accordance with the timing when the synchronous signal detection sensor 28c receives the laser beam group LK, modulation driving of the semiconductor laser elements 22a in the light source subunits 22C, 22K, 22M and 22Y is started based on the corresponding image data. As a result, the two laser beams included in each of the laser beam groups LC, LK, LM and LY form two beam spots and write image data on the image forming area on the circumferential surface of a corresponding one of the photoreceptor drums 11Y, 11M, 11C and 11K.

The two beam spots formed by each of the laser beam groups LC, LK, LM and LY synchronously performs the scanning along the main scanning direction, with a distance of 21 μm therebetween along the sub scanning direction. Accordingly, the two beam spots corresponding to a high resolution write image data simultaneously on each of the image forming areas on the circumferential surfaces of the photoreceptor drums 11Y, 11M, 11C and 11K along the main scanning direction, with a distance of 21 μm between the two beam spots along the sub scanning direction.

On the other hand, when a monochrome image is to be formed, only the semiconductor laser element 22s in the low-resolution light source subunit 22S is driven. As a result, a pair of laser beams Ld is emitted by the semiconductor laser element 22s. The low-resolution laser beam group LS, which includes the two laser beams Ld, irradiates each mirror surface of the rotating polygon mirror 21 via the second cylindrical lens 25b.

The angle of incidence of the low-resolution laser beam group LS is the same as the angle of incidence of the laser beam group LK with respect to the vertical direction (sub scanning direction) traced through the light focus point on each mirror surface of the polygon mirror 21. However, the second angle of incidence of the low-resolution laser beam group LS is different from the first angle of incidence of the laser beam group LK with respect to the horizontal direction (main scanning direction) traced through the light focus point on each mirror surface of the polygon mirror 21. Therefore, the low-resolution laser beam group LS and the laser beam group LK scan different regions on the circumferential surface of the photoreceptor drum 11K along the main scanning direction.

However, as the synchronous signal detection sensor 28c is positioned so as to receive the low-resolution laser beam group LS when the region on the photoreceptor drum 11K scanned by the low-resolution laser beam group LS is closer to the back of the image forming apparatus than the image forming area on the photoreceptor drum 11K is, modulation driving of the semiconductor laser element 22s in the low-resolution light source subunit 22S is started based on the corresponding image data in accordance with the timing when the synchronous signal detection sensor 28c receives the low-resolution laser beam group LS. As a result, image data is written on a predetermined image forming area on the circumferential surface of the photoreceptor drum 11K.

In this case, the timing to start the modulation driving of the semiconductor laser element 22s is preset based on the amount of difference between the region scanned by the laser beam group LK and the region scanned by the low-resolution laser beam group LS.

Once the modulation driving of the semiconductor laser element 22s in the low-resolution light source subunit 22S has been started based on the corresponding image data, the pair of laser beams Ld emitted by the low-resolution light source subunit 22S forms two beam spots and writes the image data on the image formation area on the photoreceptor drum 11K.

In this case, the pair of beam spots formed by the low-resolution laser beam group LS synchronously performs the scanning along the main scanning direction, with a distance of 42 μm therebetween along the sub scanning direction. Accordingly, the two beam spots corresponding to a low resolution write image data simultaneously the image forming area on the circumferential surface of the photoreceptor drum 11K along the main scanning direction, with a distance of 42 μm between the two beam spots along the sub scanning direction.

As described above, in a case where a low-resolution monochrome image is to be formed, image data is written on the photoreceptor drum 11K along the main scanning direction by a pair of beam spots having a distance of 42 μm therebetween along the sub scanning direction. This makes it possible to accelerate the speed of forming an electrostatic latent image on the photoreceptor drum 11K.

During this time, by making the polygon mirror 21 rotate at the same speed as the rotation speed of the polygon mirror 21 required to form a full-color image with use of the four high-resolution light source subunits 22C, 22K, 22M and 22Y, a monochrome image can be formed twice as fast as the speed of forming a high-resolution full-color image. Note that when making the polygon mirror 21 rotate slower than twice the rotation speed required to form a high-resolution full-color image, the speed of forming a monochrome image also becomes less than twice the speed of forming a high-resolution full-color image.

In the optical scanning device 20 pertaining to the present embodiment, the light source unit 20A disposed on one side of the polygon mirror 21 is downsized as a result of positioning the high-resolution light source subunits 22C, 22K, 22M and 22Y for forming a full-color image adjacent to one another. Hence, the optical scanning device 20 is also downsized as a whole.

The low-resolution light source subunit 22S is positioned such that the low-resolution laser beam group LS emitted thereby is incident on the same point on the polygon mirror 21 as the high-resolution laser beam group LK. The angle of incidence of the low-resolution laser beam group LS is larger than the angle of incidence of the laser beam group LK with respect to each mirror surface of the polygon mirror 21. However, due to the polygon mirror 21, the low-resolution laser beam group LS falls within an angle range that allows for deflection. Therefore, the low-resolution laser beam group LS, which irradiates the photoreceptor drum 11K after passing through the second optical system OP2 in the light reflection unit 20D, scans the entire image forming area on the photoreceptor drum 11K along the main scanning direction.

Furthermore, since the angle of incidence of the low-resolution laser beam group LS approximates the angle of incidence of the laser beam group LK with respect to each mirror surface of the polygon mirror 21, the low-resolution laser beam group LS can be positioned in the vicinity of the first reflective mirror 24 on one side of the first reflective mirror 24 where the high-resolution laser beam groups LC, LK, LM and LY are incident. This way, the low-resolution light source subunit 22S can be positioned in a small space between the first reflective mirror 24 and the light source subunit 22Y in the light source unit 20A. As a result, there is no increase in the size of the optical scanning device 20 even though the low-resolution light source subunit 22S is provided therein.

(Modification Examples)

In the above embodiment, the low-resolution laser beam group LS and the laser beam group LK are at the same height. However, the present invention is not limited to this structure, as long as the low-resolution laser beam group LS is positioned higher than the laser beam group LY, which is at the lowest position among all the laser beam groups, so as not to interfere with the reflective mirror 23c.

The image forming apparatus pertaining to the present invention is applicable not only to a printer, but also to a copier, a multiple function peripheral (MFP), a facsimile (FAX) machine, and the like.

(Summary of Embodiment)

The optical scanning device pertaining to the present invention has a compact structure because a plurality of beams emitted by a plurality of high-resolution light source subunits are directed to a single deflection unit by a first optical system. Furthermore, as a low-resolution light source subunit is provided, the optical scanning device pertaining to the present invention can form a low-resolution image. Here, as the low-resolution image is formed by the low-resolution light source subunit, the speed of forming the low-resolution image is faster than the speed of forming an image using the high-resolution light source subunits.

According to the above structure, the low-resolution light source subunit, together with the first optical system, is positioned on one side of the deflection unit. The low-resolution light source subunit does not physically interfere with any of the high-resolution light source subunits and the first optical system. This makes it possible to downsize the optical scanning device.

Moreover, a plurality of beams emitted by the low-resolution light source subunit toward the deflection unit are positioned so that they can scan the image formation area on a certain photoreceptor along the main scanning direction. Therefore, a plurality of beams emitted by one of the high-resolution light source subunits toward the deflection unit, and a plurality of beams emitted by the low-resolution light source subunit toward the deflection unit, can be positioned adjacent to one another before they irradiate the stated certain photoreceptor. This makes it possible to dispose the low-resolution light source subunit in an open space inside the optical scanning device without using an expensive optical element such as a beam splitter. As a result, there is no increase in the size of the optical scanning device, and economical efficiency of the optical scanning device is maintained.

As described above, the present invention is productive as technology for forming a low-resolution electrostatic latent image at high speed on one of a plurality of photoreceptors provided in an optical scanning device that is capable of forming a high-resolution electrostatic latent image on the plurality of photoreceptors.

The optical scanning device is preferably configured as follows: the deflection unit includes a polygon mirror; the first optical system includes a first reflective mirror that collectively reflects the sets of beams emitted by the respective high-resolution light source units toward the polygon mirror so that, on the polygon mirror, the sets of beams emitted by the respective high-resolution light source units have points of incidence that are on a single imaginary line perpendicular to the main scanning direction; and the low-resolution light source unit is positioned adjacent to the first reflective mirror.

The optical scanning device is preferably configured as follows: the set of beams emitted by the low-resolution light source unit is incident on the deflection unit at an angle of incidence that is different from an angle of incidence at which each of the sets of beams emitted by the respective high-resolution light source units is incident on the deflection unit with respect to the main scanning direction.

The optical scanning device is preferably configured as follows: the set of beams emitted by the low-resolution light source unit travels straight toward the deflection unit.

The optical scanning device is preferably configured as follows: on the polygon mirror, the points of incidence of the sets of beams that are emitted by the respective high-resolution light source units and collectively reflected by the first reflective mirror are at different positions along the sub scanning direction.

The optical scanning device is preferably configured as follows: the number of the high-resolution light source units is three or more; the high-resolution light source units include a first high-resolution light source unit that is positioned facing the first reflective mirror so that the set of beams emitted by the first high-resolution light source unit has a first angle of incidence with respect to the first reflective mirror; the first optical system includes a plurality of second reflective mirrors that each reflect a different one of the sets of beams emitted by second high-resolution light source units toward the first reflective mirror, the second high-resolution light source units being the high-resolution light source units other than the first high-resolution light source unit; and after being reflected by the second reflective mirrors, the sets of beams emitted by the respective second high-resolution light source units are incident on the first reflective mirror at the first angle of incidence.

The optical scanning device is preferably configured as follows: the second high-resolution light source units are (i) arranged side by side along paths taken and irradiated by the set of beams emitted by the first high-resolution light source unit, and (ii) at different heights.

The optical scanning device is preferably configured as follows: a distance between each second high-resolution light source unit and a corresponding one of the second reflective mirrors irradiated by the set of beams emitted by the second high-resolution light source unit is shorter as the second high-resolution light source unit is closer to an upstream side of a direction of irradiation by the set of beams emitted by the first high-resolution light source unit.

It is preferable that the optical scanning device further comprise a detection unit operable to detect that each of the sets of beams emitted by the respective high-resolution and low-resolution light source units scans an outside of an image forming area on the corresponding one of the photoreceptors, and in accordance with a result of the detection by the detection unit, a timing of beam emission is determined for each of the sets of beams emitted by the respective high-resolution and low-resolution light source units.

The optical scanning device is preferably configured as follows: the first optical system further includes (i) a first lens disposed between the first reflective mirror and the deflection unit, the first lens focusing each of the sets of beams that are emitted by the respective high-resolution light source units and reflected by the first reflective mirror onto the deflection unit, and (ii) a second lens disposed between the first reflective mirror and the deflection unit in a position different from a position of the first lens, the second lens having a different focal length from the first lens and focusing the set of beams emitted by the low-resolution light source unit onto the deflection unit.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical scanning device for use in an image forming apparatus that forms a full-color image by overlaying a plurality of images each in a different one of solid colors and that has a plurality of photoreceptors disposed in one-to-one correspondence with the solid colors, the optical scanning device comprising:

a plurality of high-resolution light source units configured to scan corresponding ones of the photoreceptors in a main scanning direction to form an electrostatic latent image on the corresponding one of the photoreceptors, each individual high-resolution light source of the plurality of high-resolution light sources being operable to emit a set of beams that irradiate one of the corresponding ones of the photoreceptors, each set of beams including at least two beams and the beams of the set of beams of the each individual high-resolution light source are distanced from one another by a predetermined distance along a sub scanning direction orthogonal to the main scanning direction;

a deflection unit;

a first optical system operable to direct the sets of beams emitted by the respective high-resolution light source units to the deflection unit;

a low-resolution light source unit configured to scan a predetermined one of the photoreceptors in the main scanning direction in order to form an electrostatic latent image thereon, the predetermined one of the photoreceptors being one of the corresponding ones of the photoreceptors that is scanned by one of the plurality of high-resolution light sources, the low resolution light source differing from the plurality of high-resolution light sources in that the low-resolution light source is operable to emit a set of beams that irradiate the predetermined one of the photoreceptors and are distanced from one another by a distance larger than the predetermined distance along the sub scanning direction; and a second optical system operable to, after the sets of beams emitted by the respective high-resolution and low-resolution light source units are directed to and deflected by the deflection unit, direct the sets of beams emitted by the respective high-resolution and low-resolution light source units to the corresponding ones of the photoreceptors, wherein the low-resolution light source unit, together with the first optical system, is positioned at one side of the deflection unit so as not to physically interfere with any of the high-resolution light source units and the first optical system, and so as to allow the set of beams emitted by the low-resolution light source unit to, after being deflected by the deflection unit and passing through the second optical system, scan an image forming area on the predetermined one of the photoreceptors along a main scanning direction.

2. The optical scanning device of claim 1, wherein
the deflection unit includes a polygon mirror,
the first optical system includes a first reflective mirror that collectively reflects the sets of beams emitted by the respective high-resolution light source units toward the polygon mirror so that, on the polygon mirror, the sets of beams emitted by the respective high-resolution light source units have points of incidence that are on a single imaginary line perpendicular to the main scanning direction, and
the low-resolution light source unit is positioned adjacent to the first reflective mirror.

3. The optical scanning device of claim 1, wherein
the set of beams emitted by the low-resolution light source unit is incident on the deflection unit at an angle of incidence that is different from an angle of incidence at which each of the sets of beams emitted by the respective high-resolution light source units is incident on the deflection unit with respect to the main scanning direction.

4. The optical scanning device of claim 1, wherein
the set of beams emitted by the low-resolution light source unit travels straight toward the deflection unit.

5. The optical scanning device of claim 2, wherein
on the polygon mirror, the points of incidence of the sets of beams that are emitted by the respective high-resolution light source units and collectively reflected by the first reflective mirror are at different positions along the sub scanning direction.

6. The optical scanning device of claim 5, wherein
the number of the high-resolution light source units is three or more,
the high-resolution light source units include a first high-resolution light source unit that is positioned facing the first reflective mirror so that the set of beams emitted by the first high-resolution light source unit has a first angle of incidence with respect to the first reflective mirror,
the first optical system includes a plurality of second reflective mirrors that each reflect a different one of the sets of beams emitted by second high-resolution light source units toward the first reflective mirror, the second high-resolution light source units being the high-resolution light source units other than the first high-resolution light source unit, and
after being reflected by the second reflective mirrors, the sets of beams emitted by the respective second high-resolution light source units are incident on the first reflective mirror at the first angle of incidence.

7. The optical scanning device of claim 6, wherein
the second high-resolution light source units are (i) arranged side by side along paths taken and irradiated by the set of beams emitted by the first high-resolution light source unit, and (ii) at different heights.

8. The optical scanning device of claim 7, wherein
a distance between each second high-resolution light source unit and a corresponding one of the second reflective mirrors irradiated by the set of beams emitted by the second high-resolution light source unit is shorter as the second high-resolution light source unit is closer to an upstream side of a direction of irradiation by the set of beams emitted by the first high-resolution light source unit.

9. The optical scanning device of claim 1, further comprising
a detection unit operable to detect that the sets of beams emitted by the respective high-resolution and low-resolution light source units scans an outside of an image forming area on the corresponding ones of the photoreceptors, wherein
in accordance with a result of the detection by the detection unit, a timing of beam emission is determined for each of the sets of beams emitted by the respective high-resolution and low-resolution light source units.

10. The optical scanning device of claim 2, wherein
the first optical system further includes:
a first lens disposed between the first reflective mirror and the deflection unit, the first lens focusing each of the sets of beams that are emitted by the respective high-resolution light source units and reflected by the first reflective mirror onto the deflection unit; and
a second lens disposed between the first reflective mirror and the deflection unit in a position different from a position of the first lens, the second lens having a different focal length from the first lens and focusing the set of beams emitted by the low-resolution light source unit onto the deflection unit.

11. An image forming apparatus that includes an optical scanning device, forms a full-color image by overlaying a plurality of images each in a different one of solid colors, and that has a plurality of photoreceptors disposed in one-to-one correspondence with the solid colors, wherein
the optical scanning device comprises:
a plurality of high-resolution light source units configured to scan corresponding ones of the photoreceptors in a main scanning direction to form an electrostatic latent image on the corresponding one of the photoreceptors, each individual high-resolution light source of the plurality of high-resolution light sources being operable to emit a set of beams that irradiate one of the corresponding ones of the photoreceptors, each set of beams including at least two beams and the beams of each the set of beams of the each individual high-resolution light source are distanced from one another by a predetermined distance along a sub scanning direction orthogonal to the main scanning direction;
a deflection unit;
a first optical system operable to direct the sets of beams emitted by the respective high-resolution light source units to the deflection unit;
a low-resolution light source unit configured to scan a predetermined one of the photoreceptors in the main scanning direction in order to form an electrostatic latent image thereon, the predetermined one of the photoreceptors being one of the corresponding ones of the photoreceptors that is scanned by one of the plurality of high-resolution light sources, the low resolution light source differing from the plurality of high-resolution light sources in that the low-resolution light source is operable to emit a set of beams that irradiate the predetermined one of the photoreceptors and are distanced from one another by a distance larger than the predetermined distance along the sub scanning direction; and a second optical system operable to, after the sets of beams emitted by the respective high-resolution and low-resolution light source units are directed to and deflected by the deflection unit, direct the sets of beams emitted by the respective high-resolution and low-resolution light source units to the corresponding ones of the photoreceptors, and the low-resolution light source unit, together with the first optical system, is positioned at one side of the deflection unit so as not to physically interfere with any of the high-resolution light source units and the first optical system, and so as to allow the set of beams emitted by the low-resolution light source unit to, after being deflected by the deflection unit and passing through the second optical system, scan an image forming area on the predetermined one of the photoreceptors along a main scanning direction.

12. The optical scanning device of claim 1, wherein each of the high-resolution light source units is arranged at a different height.

13. The optical scanning device of claim 12, wherein the low-resolution light source unit is arranged above at least one of the high resolution light source units.

14. The optical scanning device of claim 1, wherein the low-resolution light source unit is arranged above at least one of the high resolution light source units.

15. The optical scanning device of claim 12, wherein the plurality of high-resolution light source units comprises four high-resolution light source units and the low resolution light source unit is arranged at a same height as a second highest one of the high-resolution light source units.

16. The optical scanning device of claim 1, wherein the number of high resolution light source units is three or more, each of the high resolution light source units is arranged at a different height from others of the high resolution light source units, and the low resolution light source unit is arranged above at least one of the high resolution light source units and below at least another of the high resolution light source units.

* * * * *